UNITED STATES PATENT OFFICE.

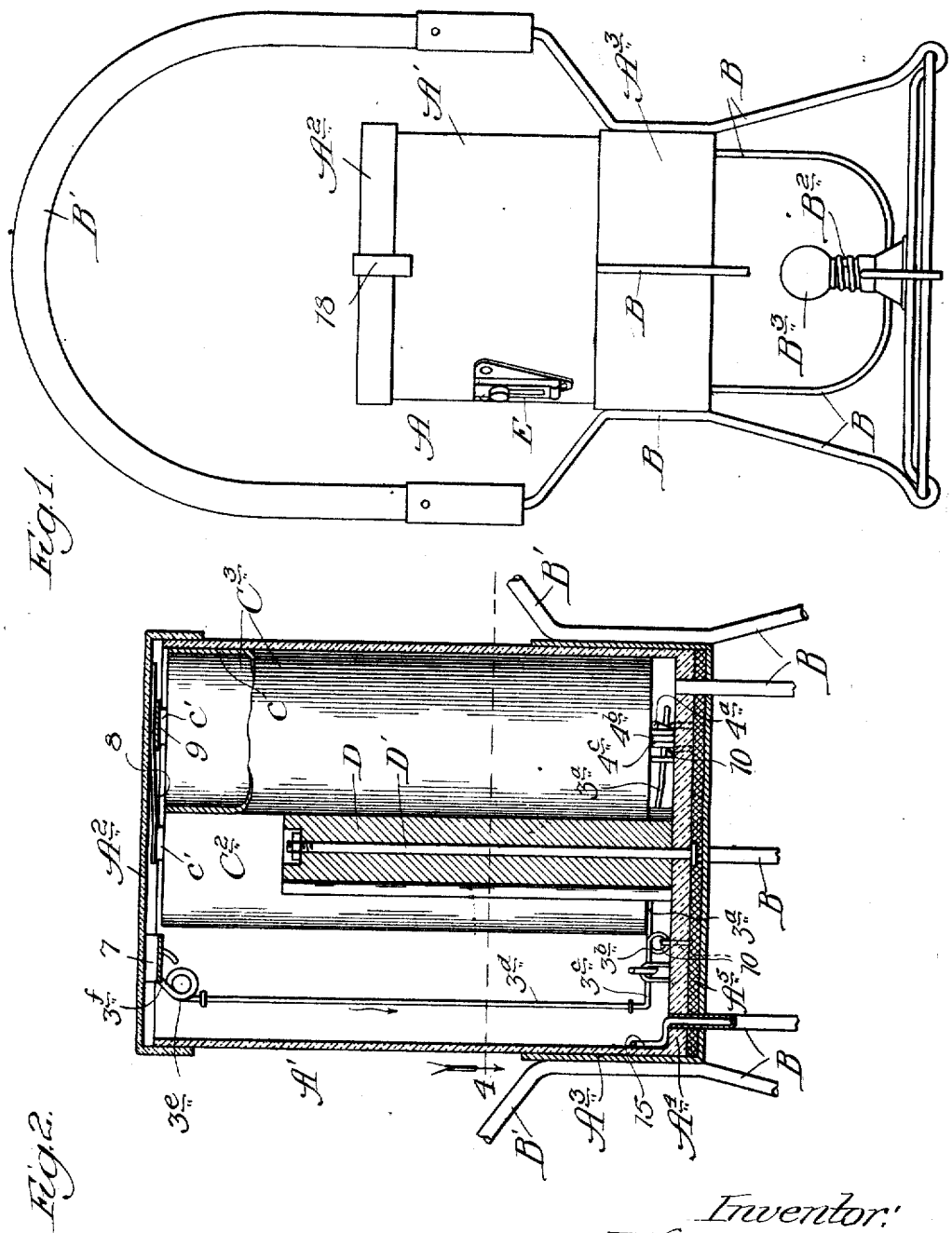

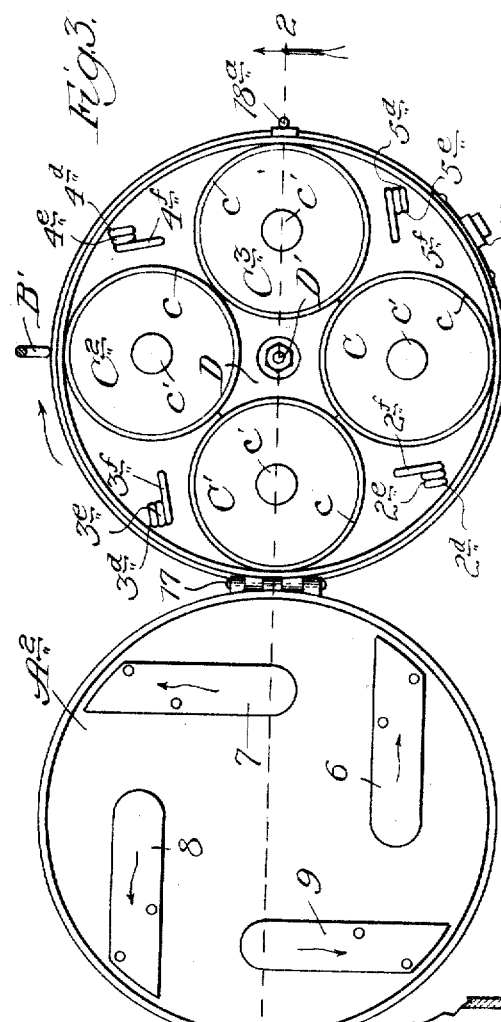

WILLIAM BALDERSTON, OF MADISON, WISCONSIN, ASSIGNOR TO FRENCH BATTERY & CARBON CO., OF MADISON, WISCONSIN, A CORPORATION OF WISCONSIN.

BATTERY.

1,404,262.

Specification of Letters Patent.   Patented Jan. 24, 1922.

Application filed August 6, 1920. Serial No. 401,713.

*To all whom it may concern:*

Be it known that I, WILLIAM BALDERSTON, a citizen of the United States, residing at Madison, in the county of Dane and State of Wisconsin, have invented a new and useful Improvement in Batteries, of which the following is a specification.

The present invention is in the nature of an improvement on the battery disclosed and claimed in U. S. application of Otto E. Ruhoff, Donald W. Tyrrell and myself, Number 383,221, filed May 21, 1920.

The primary object of the invention is to provide a battery in which cells may be introduced with the carbon-pole presented upwardly, the cells being automatically connected in series by introducing them into the battery.

The fundamental purpose of a battery of this type is to enable practically all of the electrical energy of the cells to be utilized and a more uniform voltage in the battery to be maintained. For illustration, it is proposed, in connection with a four-cell battery, to use a lamp rated at about 3 volts, starting with two cells, and after the voltage drops adding another cell, and, when necessary, another cell, thus building up the voltage of the battery as may be necessary. Then, as the voltage drops and the light becomes dim, one of the oldest cells is removed and replaced by a new cell. Subsequently, another of the oldest cells is removed and replaced by a new cell; and then, from time to time, the oldest cell is removed and replaced by a new one. In this manner, the voltage may be kept reasonably uniform, and the several cells may be used until each, in turn, is practically exhausted. Thus, instead of losing from one-third to one-half of the electrical energy contained in a cell; practically the entire energy of the cell will be utilized.

The invention is illustrated, in its preferred embodiment, in the accompanying drawings, in which—

Fig. 1 represents an elevational view of a lantern embodying the invention; Fig. 2, a broken vertical sectional view taken as indicated at line 2 of Fig. 3; Fig. 3, a plan view, showing the lid of the container open; Fig. 4, a plan sectional view taken as indicated at line 4 of Fig. 2, the cells having been removed from the container; Fig. 5, a broken vertical sectional view taken as indicated at line 5 of Fig. 4; and Fig. 6, a broken vertical sectional view taken as indicated at line 6 of Fig. 5, and showing a detail of a circuit-closer employed.

In the construction illustrated, A represents a container having a body $A'$ and a cover $A^2$ of insulating material, and having a metallic base portion $A^3$ within which the lower end portion of the body $A'$ is secured; B represents a metallic supporting frame secured to the metal base portion $A^3$ and equipped with a handle or bail $B'$, said frame being adapted to serve as a support for the structure and being equipped centrally below the container with a lamp-socket $B^2$ which receives a lamp-bulb $B^3$; C, $C'$, $C^2$ and $C^3$, a series of cells arranged in a circle within the container; and D, a central post, preferably of wood or other insulating material, which is rigidly secured, by means of a screw-rod $D'$, to the bottom of the container-body $A'$.

The central post is provided at its four vertical sides with concavities which conform to the cells. Thus, the post presents radial division walls $D^2$ which enter between the cells; and the cells are confined between the concave surfaces and the cylindrical wall afforded by the body $A'$.

Each of the cells preferably has its zinc container sheathed in a cardboard tube $c$, the bottom of the zinc container being left uncovered for contact purposes; and each cell has an upwardly presented carbon-pole $c'$.

The body $A'$ may be formed of heavy cardboard or vulcanized fiber. The bottom wall of said body is designated $A^4$; and interposed between the member $A^4$ and the bottom wall of the cup-shaped metal base $A^3$ is a coating or disk of insulation $A^5$.

The construction described forms a nest for the cells of the battery. Within this nest is arranged a series of zinc-pole contacts 1, 2, 3 and 4, arranged to form a rectangle above the bottom $A^4$, these zinc-pole contacts being normally connected automatically in series when the cells are removed. With the exception of the member 1, the zinc-pole contacts are provided with vertical extensions which lead to the top of the container and are adapted to be connected, through the medium of contact members carried by the cover, with the carbon-poles of the cells. If we assume the current to pass from the cells by way of the carbon-poles, the vertical extensions referred to really constitute downward leads for conducting the current from the carbon-pole of one cell to the zinc-pole of the next cell in the series. The downward lead from the last cell of the series is afforded by a wire 5.

The member 1 comprises a substantially horizontal portion 1$^a$ which serves as a zinc-pole contact, a coil 1$^b$, a horizontal offset portion 1$^c$, and a vertical shank portion 1$^d$ secured to the vertical wall of the container-body A'; the member 2 comprises a substantial horizontal portion 2$^a$ which serves as a zinc-pole contact, a coil 2$^b$, a horizontal offset portion 2$^c$, a vertical lead 2$^d$, a coil 2$^e$ at the upper end, and a contact 2$^f$ carried by the coil 2$^e$; the member 3 comprises similar parts, designated by the numeral 3 with corresponding index letters; the member 4 comprises similar parts, designated by the numeral 4 with corresponding index letters; and the member 5 comprises a short horizontal portion 5$^c$, a vertical portion 5$^d$ an upper coil 5$^e$, and a contact member 5$^f$ carried by the coil 5$^e$.

The contact members and extensions are secured to the container by staples. The inner surface of the cover A$^2$ is equipped with a series of spring-contacts 6, 7, 8 and 9, adapted, when the cover is closed, to bridge the space between the carbon-pole of each cell and the contact-member carried by the upper end of the appropriate downward lead, so that when the cells are in the nest and the cover closed, the cells will be connected in series. Thus, the contact-member 6 is adapted to bridge the space between the carbon-pole of the cell C and the contact-member 2$^f$; the contact-member 7 is adapted to bridge the space between the carbon-pole of the cell C' and the contact member 3$^f$; and so on through the series.

The lower coils 1$^b$, 2$^b$, etc. are connected with the bottom wall A$^4$ by means of staples 10. The vertical portions of the wires are connected with the cylindrical wall of the member A' by means of staples 11. The zinc-pole contacts 1$^a$, 2$^a$, etc. have their free end portions extending freely through staples 12 carried by the bottom wall A$^4$; and the free extremities of these zinc-pole contacts normally make contact with the offset horizontal portions 2$^c$, 3$^c$, etc. of the wires, so that, assuming the cells to be removed, the zinc-pole contacts are connected in series. The last zinc-pole contact 4$^a$ of the series normally makes contact with the offset portion 5$^c$ of the downward lead-member 5. The vertical portion 5$^d$ of the last downward lead of the series is connected, by a conductor 13, with one of the points of a switch or circuit-closer E which is applied to the vertical wall of the container A'. The switch-point 14 is connected, by a conductor 15, with the central contact of the lamp-bulb B$^3$. The vertical shank portion 1$^d$ of the first zinc-pole contact of the series is connected, by a conductor 16, with the metal base A$^3$ of the container. The current may be assumed to pass through the conductor 16 to the metal frame, thence through the shell of the shank of the lamp-bulb, thence through the lamp-bulb to the central contact thereof, and back by the wire 15 to the switch.

The cover A$^2$ is connected with the container-body A' by means of a hinge 17; and the cover is provided with a spring-catch 18 adapted to engage a catch-member 18$^a$ with which the body A' is equipped.

Bearing in mind that the shell of the lamp-bulb is grounded in the metal frame and that the metal frame is connected through the medium of the wire 16 with the contact-member 1, while the central terminal of the lamp-bulb is connected, through the medium of the wire 15, with one of the switch-points, it will be seen that there is a circuit from the conductor 16 through the zinc-pole contacts in series to the member 5, and thence through the conductor 13 to the switch. If a cell be introduced, it will automatically interrupt the contact between its own zinc-pole contact and the next zinc-pole contact of the series and the cell will itself be automatically connected or introduced into the circuit. For illustration, if a cell be introduced into the first compartment of the nest, it will depress the zinc-pole contact 1$^a$, thus breaking contact between the extremity of the member 1$^a$ and the portion 2$^c$ of the next contact-member of the series. At the same time, the circuit will be re-established through the zinc of the cell, thence through the filling material of the cell and the carbon-pole, thence through the bridging contact-member 6 to the contact-member 2$^f$, thence down through the lead 2$^d$, and thence through the zinc-pole contact-member 2$^a$ and the remaining zinc-pole contact-members to the contact-member 5 which is connected with one of the switch-points. In the same manner, if a cell be introduced in any of the compartments, it will automatically interrupt the connection between the contact-members at the base of the nest and re-establish the circuit through itself.

By using a lamp of approximately one-half the combined voltage of the number of cells for which the battery is designed, assuming such cells to be fresh, it is possible to operate with a reduced number of cells at the outset, and introduce fresh cells, from time to time, to bolster up the voltage, each cell being discarded, in turn, after having utilized practically all of its electrical energy. By employing this method of operation, the voltage may be kept fairly uniform, moreover.

It will be understood that the invention is adapted to enable practically all of the electrical energy of the cells to be utilized, not only for the purpose of operating a light in the manner described, but also for any other purpose where such a battery may be desired. Further economy results from the capability of employing the cell-holder for a prolonged period of time, simply by introducing new cells, as needed, thus avoiding the expense of constructing an entirely new battery when the cells become exhausted.

While the preferred embodiment for the purpose described is illustrated, any suitable embodiment may be employed.

The foregoing detailed description has been given for clearness of understanding only, and no unnecessary limitation should be understood therefrom, but the appended claims should be construed as broadly as permissible in view of the prior art.

What I regard as new, and desire to secure by Letters Patent, is—

1. In a battery, the combination of a cell-holder equipped at its base portion with zinc-pole contact-members normally connected in series, a cell adapted to be introduced therein with its carbon-pole presented upwardly, said cell being adapted when inserted axially to interrupt the connection at the base portion of said cell-holder and establish itself in circuit, and means for establishing connection between the carbon-pole of the cell and one of the zinc-pole contacts of the series.

2. In a battery, the combination of a cell-holder having a series of compartments, each compartment being equipped at its lower end with a zinc-pole contact-member, said contact-members being automatically connected in series, leads extending from the upper portion of the cell-holder and normally in circuit with said zinc-pole contact-members, and means at the upper end of said cell-holder for establishing connections between the carbon-poles of cells and said leads.

3. In a battery, the combination of a cell-holder provided with a plurality of compartments equipped at their base portions with zinc-pole contacts automatically connected in series, leads extending from said zinc-pole contacts to the upper end of the cell-holder, a cover for the cell-holder, and bridging contact-members carried by said cover and adapted to establish connections between the carbon-poles of cells and said leads.

4. In a battery, the combination of a container provided with cell compartments, zinc-pole contact-members disposed above the bottom of said container and normally established in series, said contact-members being depressible to automatically interrupt the circuit when cells are introduced, leads extending from said contact-members to the upper end of the container, and a member equipped with a series of bridging contact-members adapted to connect the carbon-pole of each cell with the lead which is next in series.

5. In a battery, the combination of a container having a plurality of cell compartments, a zinc-pole contact-member extending across the bottom of each compartment, said contact-members being normally connected in series, leads extending from each of said contact-members, except the first one of the series, to the upper portion of the container, a lead extending from the upper portion of the container to the last contact-member of the series and making contact therewith which is adapted to be broken, and a closure device equipped with bridging contact-members adapted to automatically establish connection between the carbon-pole of each cell introduced and the lead which is next in series.

6. In a battery, the combination of a container provided with a series of cell compartments, a series of zinc-pole contact-members in the lower portions of said compartments, said contact-members having leads extending to the upper portion of the container, excepting the first contact-member of the series, an independent lead extending from the upper portion of the container to the lower end thereof, the last contact-member of the series making automatic contact with said last-mentioned lead, and each of the other contact-members of the series making automatic contact with the next contact-member of the series, a closure, and bridging contact-members carried by said closure and adapted to connect the carbon-pole of each cell introduced with the lead which is next in series.

7. In a battery, the combination of a container provided with a plurality of cell-compartments, a series of zinc-pole contact-members mounted in the lower portions of said compartments and equipped with leads extending to the upper portion of the container, the first contact-member of the series being without such lead, an independent lead extending from the upper portion of the container to the lower portion thereof, said contact members being automatically connected in series and the last contact-member being automatically connected with the last mentioned lead, said contact-members being adapted to be displaced by cells introduced and thus interrupt the series, a closure device, and bridging contact-members carried by said closure device and adapted to automatically connect the carbon-pole of each cell introduced with the lead which is next in series, when the closure is moved to the closed position.

8. In a battery, the combination of a container provided with a plurality of cell compartments, a plurality of spring zinc-pole contact-members in the lower portions of said compartments and normally connected in series, each of said contact-members having a horizontal spring-arm, an offset horizontal portion, and a vertical lead portion, the spring-arm of one contact-member normally bearing against the offset portion of the next contact member in the series, an independent lead extending from the upper portion of the container to the lower portion thereof and making contact with the extremity of the spring-arm of the last contact-member of the series, a zinc-pole contact-member extending across the lower portion of the first compartment and normally contacting with the offset portion of the succeeding contact-member, outlet conductors connected with the first zinc-pole contact-member of the series and with the last lead of the series, a closure device, and contacts carried by said closure device and adapted to establish connection between the carbon-poles of cells introduced and the succeeding leads, in series.

9. In a battery, the combination of a container provided with a plurality of cell compartments, zinc-pole contact-members arranged in a polygonal series in the lower portions of said compartments and normally contacting with each other in series, leads extending from said contact-members to the upper portion of the container, the last lead of the series making contact with the last zinc-pole contact of the series, outlet connections for the first zinc-pole contact of the series and the last lead of the series, and means in the upper portion of the container for bridging the spaces between the carbon-poles of cells introduced and the leads, in series.

10. The combination of a container provided with a bottom of insulating material, a series of substantially horizontal spring contact-members mounted on said bottom and arranged in series, leads extending from said contact-members to the upper portion of the container, and means in the upper portion of the container for establishing connections between the carbon-poles of cells introduced and said leads, in series.

11. In a battery, the combination of a container comprising a cylindrical wall and bottom wall of insulating material, means dividing said container into cell compartments, a series of spring contact-members extending across the bottoms of said compartments and normally connected in series, leads extending from said contact-members to the upper portion of the container, said leads being secured to said cylindrical wall and equipped at their upper ends with contact-members, and a closure for said container equipped with bridging contact-members adapted to establish connection between the carbon-poles of cells introduced and the contact-members at the upper ends of said leads.

12. In a battery, the combination of a container of insulating material, means dividing said container into cell compartments, a series of spring contact-members in the lower portions of said compartments and arranged to contact with each other in series, leads permanently connected with said contact-members, except the first one of the series, an independent lead making contact with the last contact-member of the series, a closure equipped with bridging contact-members for establishing connections between the carbon-poles of cells introduced and said leads in series, a metallic supporting frame, a switch, and outlet connections for the first spring contact-member of the series and the last lead of the series, one of said outlet connections being connected with said metallic frame and the other being connected with the switch.

13. In a battery, the combination of a cylindrical container, a central post rising from the bottom thereof and provided with means for dividing the container into cell compartments, a series of spring contact-members in the lower portions of said compartments and contacting with each other in series, a series of leads extending to the upper portion of the container, a closure, and a series of bridging contact-members adapted to establish connections between the carbon-poles of cells introduced and the leads, in series.

14. In a battery of the character set forth, a container provided with a plurality of cell compartments, and a series of combined lead-and-contact members, each comprising a substantially horizontal contact-arm in the bottom of a compartment, a coil-spring connected with the base portion of said arm, and a lead rising from said coil spring.

15. In a battery of the character set forth, a container provided with a plurality of cell compartments, and a series of combined lead-and-contact members, each comprising a substantially horizontal contact-arm in the bottom of a compartment, a coil spring connected with the base portion of said arm, a lead rising from said coil spring, and a spring contact carried by the upper end portion of said lead.

16. In a battery, the combination of a container provided with a plurality of cell compartments, and a series of combined lead-and-contact members, each comprising a horizontal spring-arm, a coil at the base portion thereof, a vertical lead wire, and staples connecting each lead-and-contact member with said container.

WILLIAM BALDERSTON.